US006775112B1

(12) United States Patent
Smith et al.

(10) Patent No.: US 6,775,112 B1
(45) Date of Patent: Aug. 10, 2004

(54) APPARATUS AND METHOD FOR IMPROVING ESD AND TRANSIENT IMMUNITY IN SHUNT REGULATORS

(75) Inventors: Gregory J. Smith, Tucson, AZ (US); Donald Archer, Santa Clara, CA (US); John Wendell Oglesbee, Watkinsville, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 337 days.

(21) Appl. No.: 09/849,707

(22) Filed: May 4, 2001

Related U.S. Application Data

(60) Provisional application No. 60/203,795, filed on May 12, 2000.

(51) Int. Cl.[7] .................................... H02H 3/22
(52) U.S. Cl. .................................... 361/18; 361/111
(58) Field of Search .................................... 361/18, 56, 58, 361/91.1, 91.2, 111, 118, 119; 323/266, 268, 274

(56) References Cited

U.S. PATENT DOCUMENTS 4,008,418 A * 2/1977 Murphy .................... 361/18
5,212,616 A * 5/1993 Dhong et al. .............. 361/18
5,333,105 A * 7/1994 Fortune .................. 363/56.11
5,578,960 A * 11/1996 Matsumura et al. ........ 327/535
5,629,608 A * 5/1997 Budelman ................ 323/268
5,838,145 A * 11/1998 Poon et al. .............. 323/266
6,249,410 B1 * 6/2001 Ker et al. ................ 361/56
6,320,363 B1 * 11/2001 Oglesbee et al. .......... 323/303
6,400,540 B1 * 6/2002 Chang .................... 361/56
6,411,482 B1 * 6/2002 Funke .................... 361/91.1
6,424,510 B1 * 7/2002 Ajit et al. ................ 361/59
6,509,723 B2 * 1/2003 Matsushita .............. 323/281
6,552,583 B1 * 4/2003 Kwong .................... 327/112

* cited by examiner

*Primary Examiner*—Brian Sircus
*Assistant Examiner*—Danny Nguyen
(74) *Attorney, Agent, or Firm*—Brett A. Hertzberg; Merchant & Gould P.C.

(57) ABSTRACT

Voltage regulators are exposed to extreme amounts of voltage over short periods of time during an electrostatic discharge (ESD) event. Shunt regulators require protection from ESD events. Capacitors are passive devices that allow current flow when not in a steady-state condition. An apparatus and method compensates for the extreme voltages inherent in ESD events. By providing capacitance across the gate-drain junction of the shunt device in combination with a gate resistor, a voltage can be applied to the gate of the active device upon commencement of an ESD event, and cause the active device to "turn on" The "turned on" active device provides a pathway for the excess voltage from the ESD event to follow and discharge so as to avoid catastrophic failures.

22 Claims, 7 Drawing Sheets

APPARATUS AND METHOD FOR IMPROVING ESD AND TRANSIENT IMMUNITY IN SHUNT REGULATORS

This application claims the benefit under 35 U.S.C. § 119(e) of U.S. Provisional Application No. 60/203,795, filed on May 12, 2000.

FIELD OF THE INVENTION

The present invention relates to electronic circuits that utilize shunt regulators. In particular, the present invention relates to a method and apparatus that provides for enhanced protection from electrostatic discharge (ESD) in shunt regulators.

BACKGROUND OF THE INVENTION

Static electricity has been an industrial problem for centuries including such examples as paper and grain mills. The age of electronics brought with it new problems associated with static electricity and electrostatic discharge. Additionally, as electronic devices have become faster and smaller, their sensitivity to electrostatic discharge (ESD) has increased. Today, ESD impacts productivity and product reliability in virtually every aspect of the electronic environment. Despite a great deal of effort during the past decade, ESD still affects production yields, manufacturing costs, product quality, product reliability, and profitability. The costs of damaged devices can range from only a few cents for a simple diode device to several hundred dollars for complex hybrid microelectronic circuits.

An example of an ESD test circuit (100) for an electronic circuit is shown in FIG. 1. ESD test circuit 100 includes an ESD tester (110) and test a device (120). The ESD tester (110) includes a voltage supply ($V_1$), a circuit ground potential (GND), a capacitor ($C_1$), two resistors ($R_{10}$ and $R_{11}$), an inductor ($L_1$), and a switch ($SW_1$).

The voltage supply ($V_1$) includes a ground terminal that is connected to the circuit ground potential (GND) and a power terminal that is connected to node $N_{10}$. Resistor $R_{10}$ is connected between nodes $N_{10}$ and $N_{11}$. Capacitor $C_1$ is connected between node $N_{11}$ and the circuit ground potential (GND). Resistor $R_{11}$ is connected between nodes $N_{11}$ and $N_{12}$. Inductor $L_1$ is connected between nodes $N_{12}$ and $N_{13}$. Switch $SW_1$ is connected between nodes $N_{13}$ and $N_{14}$. A test control signal (TCTL) is in communication with switch $SW_1$. Test device (120) includes a test pin ($P_1$) that is connected to node $N_{14}$ and a ground pin ($P_2$) that is connected to the circuit ground potential (GND).

Electrostatic discharge is the direct transfer of electrostatic charge through a significant series resistor from the human body or from a charged material to the electrostatic discharge sensitive (ESDS) device. The model used to simulate this event is the Human Body Model (HBM). The Human Body Model is the oldest and most commonly used model for classifying device sensitivity to ESD. The HBM testing model represents the discharge from the fingertip of a standing individual delivered to the device. In one example, the HMB is modeled by a 100 pF capacitor($C_1$), a 1.5 kΩ series resistor ($R_{11}$), a 100 MΩ resistor ($R_{10}$), and a 4 uH inductor ($L_1$). In operation, at a first time, switch $SW_1$ is in an open position allowing capacitor $C_1$ to charge to the full potential of the voltage supply ($V_1$). At a subsequent time, switch $SW_1$ is closed by the test control signal TCTL causing the capacitor ($C_1$) to discharge through the series combination of resistor ($R_{11}$), inductor ($L_1$), switch $SW_1$, and into the test device (120) through test pin $P_1$. If the test device does not have sufficient ESD protection, it will be damaged during this test.

SUMMARY OF THE INVENTION

The present invention is directed to a method and an apparatus that improves electrostatic discharge protection in a shunt regulator. An improved shunt regulator includes an "on-chip" Miller capacitance circuit that is coupled between the drain and gate terminals of a field effect transistor (FET) shunt device. The Miller capacitance circuit provides a fast transient signal path that activates the FET to prevent damage.

Briefly stated, voltage regulators are exposed to extreme amounts of voltage over short periods of time during an electrostatic discharge (ESD) event. Shunt regulators include one or more devices that require protection from ESD events. ESD events inherently introduce extreme voltages into the shunt regulator. Capacitors are passive devices that may be used to couple high frequency signals. By providing a capacitance circuit between the gate and drain of the shunt device (or devices) in combination with a resistor circuit, a voltage can be applied to the gate of the shunt device(s) that activates the shunt device(s) in response to a fast-transient ESD event. The applied gate voltage causes the shunt device(s) to "turn on", thereby providing a path for the excess voltage from the ESD event to discharge through so as to avoid catastrophic failures. A master-slave ESD protection device may be supplemented to the improved shunt regulator to further protect the shunt regulator from longer lasting ESD events.

In one aspect, the present invention is directed toward an apparatus for improving fast transient protection in a shunt circuit that includes a control terminal. The apparatus includes a protection circuit that is arranged to couple a fast transient signal to the control terminal in response to a fast transient event such that the shunt circuit is activated in response to the fast transient signal and the shunt circuit is protected from the fast transient event.

In another aspect, the present invention is directed toward an apparatus for improving electrostatic discharge protection in a shunt regulator. The apparatus includes an error amplifier circuit that is arranged to produce a control signal at a control terminal in response to a reference potential and a potential at a power supply terminal. The error amplifier has an associated amplifier response time. A capacitance circuit is arranged to couple a fast transient signal to the control terminal in response to a fast transient ESD event that occurs at the power supply terminal. A resistance circuit is arranged to produce another control signal at the control terminal in response to the fast transient signal. A shunt circuit is arranged to selectively couple power from the power supply terminal to a circuit ground terminal when activated. The shunt circuit is activated by the control signal during normal operation and the shunt circuit is activated by the other control signal during the fast transient ESD event. Excess energy from the fast transient ESD event is shunted from the power supply terminal to the circuit ground terminal by providing the other control signal to the control terminal in a time interval that is shorter than the amplifier response time.

In yet another aspect, the present invention is directed toward another apparatus for improving electrostatic discharge protection in a shunt regulator. The apparatus includes a means for amplifying that is arranged to produce a control signal at a control terminal in response to a reference potential and a regulation potential. The regulation potential is associated with a power supply terminal. A means for coupling is arranged to couple a fast transient signal to the control terminal in response to a fast transient ESD event that occurs at the power supply terminal. A means for producing is arranged to produce another control signal at the control terminal in response to the fast transient signal. A means for shunting is arranged to selectively couple power from the power supply terminal to a circuit ground terminal when activated. The shunt circuit is activated by the control signal during normal operation and the shunt circuit is activated by the other control signal during the fast transient ESD event. Excess energy from the fast transient ESD event is shunted from the power supply terminal to the circuit ground terminal by providing the other control signal to the control terminal in a time interval that is shorter than the amplifier response time.

In a further aspect, the present invention is directed toward a method of protecting a shunt device in a shunt circuit regulator from a fast ESD event on a power terminal. The method includes detecting the fast ESD event with a capacitance circuit, providing a current through the capacitance circuit in response to the fast ESD event, producing a potential in response to the current, coupling the potential to a control terminal of the shunt device such that the potential activates the shunt circuit, and coupling power from the power terminal through the shunt circuit to the circuit ground potential when the shunt device is active such that the shunt device is protected from the energy produced by the fast ESD event.

A more complete appreciation of the present invention and its improvements can be obtained by reference to the accompanying drawings, which are embodiments of the invention briefly summarized below, to the following detail description of presently preferred, and to the appended claims.

DETAILED DESCRIPTION OF THE PREFERRED EMBODIMENT

Figure 1:
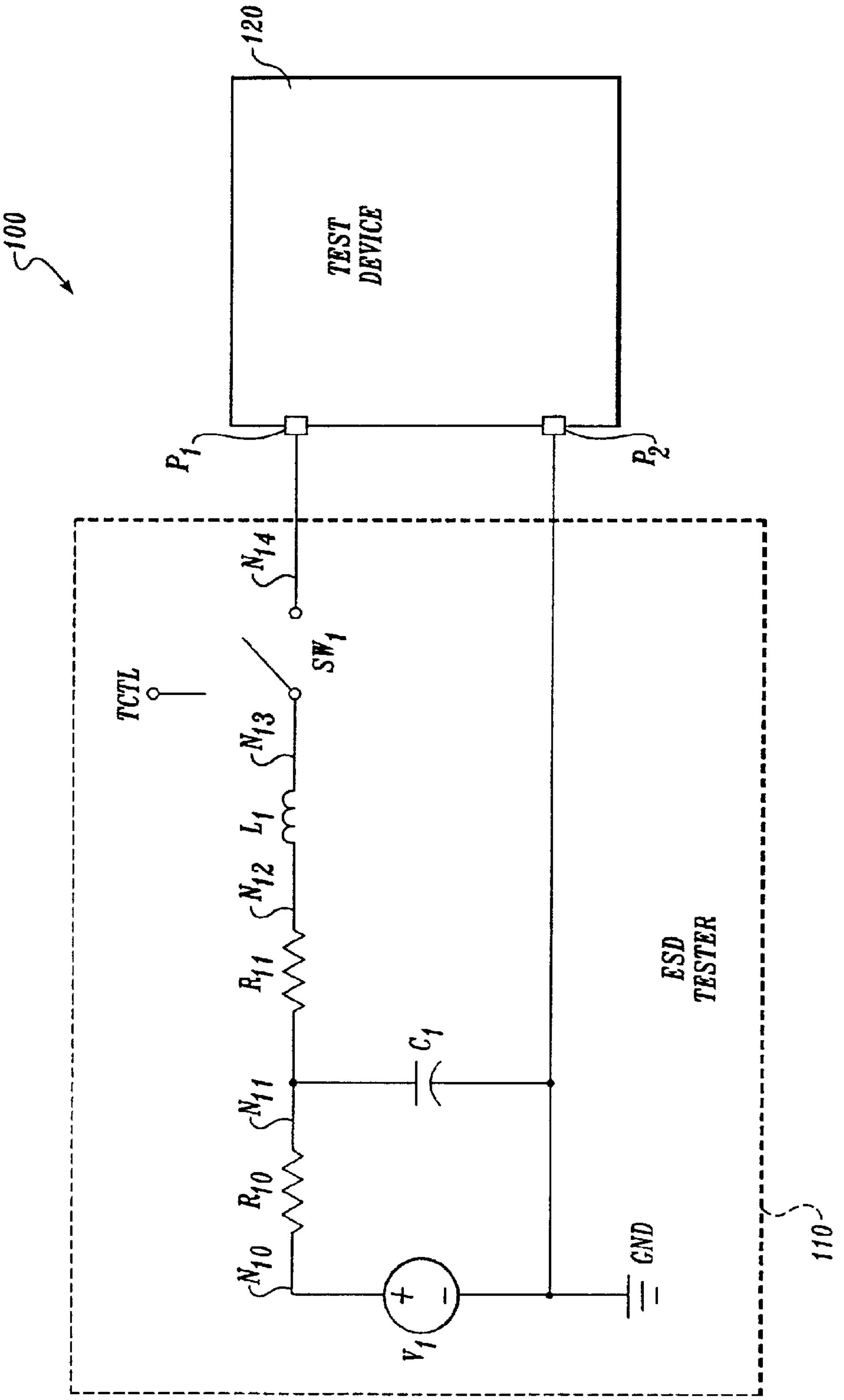
Fig. 1 (PRIOR ART)
FIG. 1 is a schematic diagram illustrating a conventional ESD test circuit.

Throughout the specification, and in the claims, the term "connected" means a direct electrical connection between the things that are that is connected, without any intermediary devices. The term "coupled" means either a direct electrical connection between the things that are that is connected, or an indirect connection through one or more passive or active intermediary devices. The term "circuit" means one or more passive and/or active components that are arranged to cooperate with one another to provide a desired function. The term "signal" means at least one current signal, voltage signal or data signal.

The present invention relates to ESD protection in shunt regulators. More particularly, the present invention relates to shunt devices in a shunt regulator that have enhanced ESD protection. Shunt regulators are advantageous as they have the ability to maintain output regulation when large transient currents occur in an electronics system. However, a shunt regulator has only limited protection from large voltage swings over short time intervals, (e.g., an electrostatic discharge (ESD) event). Without adequate protection, the shunt device portion of the shunt regulator may be damaged by the instantaneous increase in voltage resulting from an ESD event.

Electrostatic discharge (ESD) must be addressed when designing electronic circuits, such as battery protection circuits. While all electronic circuits are affected by ESD, Lithium based batteries, including Lithium-ion and Lithium-Polymer batteries tend to be sensitive to excessive voltage. Without a suitable safety circuit, an ESD event could compromise electronic circuit integrity and reliability as well as battery reliability and safety.

Conventional shunt regulators utilize ESD protection devices that are connected in parallel with the shunt regulator to dispose of the energy resulting from the ESD event. These parallel-connected devices can be presented as a master component controlling one or more slave components that provide a separate shunt path for the excess energy. These solutions require valuable "on-chip" space allocations and often are damaged if the excess energy generated from the ESD event exceeds their design specifications.

The present invention enhances ESD protection in a shunt regulator by utilizing components of the existing shunt regulator in conjunction with a capacitance circuit that is coupled across one or more devices in the regulator. A common circuit used in constructing shunt regulators utilizes field effect transistors (FETs) as a shunt device. In one embodiment, metal oxide semiconductor FETs (MOSFETs) are utilized as the shunt device(s). MOSFETS possess inherent capacitance, also known as fringe capacitance, due to the interaction of the materials used to construct them. However, the value of fringing capacitance fluctuates over ranges of temperature, frequency, processing, and the like. Additionally, fringe capacitance values are very small in comparison to capacitance values needed to implement the present invention. The present invention has identified that the fringe capacitance inherent in a MOSFET device is inefficient at coupling fast transients and thus ineffective for ESD protection. As will be described below and illustrated in the following figures, the addition of capacitance in an amount and at a location necessitated will enhance ESD protection to the shunt device.

Figure 2:
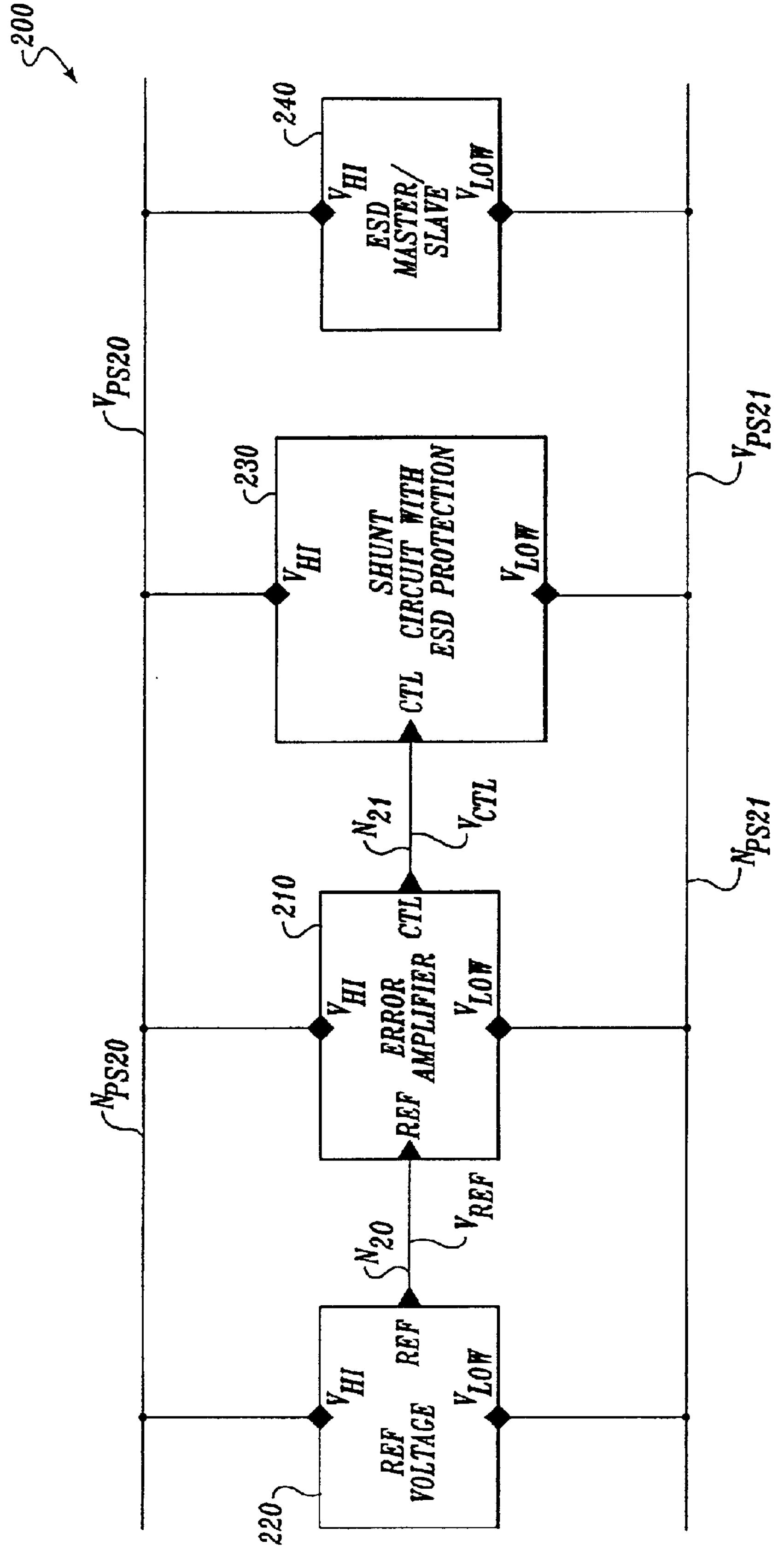
FIG. 2 is a schematic diagram illustrating an improved shunt regulator circuit that includes enhanced ESD protection in accordance with an embodiment of the present invention.

FIG. 2 is a schematic illustrating an example of a shunt regulator circuit (200) with enhanced ESD protection that is in accordance with the present invention. In FIG. 2, the shunt regulator circuit (200) includes an error amplifier circuit (210), a reference voltage circuit (220), a shunt circuit with ESD protection (230), and an ESD master/slave protection circuit (240).

The error amplifier circuit (210) includes a high supply terminal ($V_{HI}$) that is connected to a high power supply node ($N_{ps20}$), a low supply terminal ($V_{LOW}$) that is connected to a low power supply node ($N_{ps21}$), an input voltage reference terminal (REF) that is connected to node $N_{20}$, and a control terminal (CTL) that is connected to node $N_{21}$. The reference voltage circuit (220) includes a high supply terminal ($V_{HI}$) that is connected to the high power supply node ($N_{ps20}$), a low supply terminal ($V_{LOW}$) that is connected to the low power supply node ($N_{ps21}$) and a voltage reference terminal (REF) that is connected to node $N_{20}$. The shunt circuit with ESD protection (230) includes a high supply terminal ($V_{HI}$) that is connected to the high power supply node ($N_{ps20}$), a low supply terminal ($V_{LOW}$) that is connected to the low power supply node ($N_{ps21}$), and a control terminal (CTL) that is connected to node $N_{21}$. The master/slave protection circuit (240) is an optional circuit that includes a high supply terminal ($V_{HI}$) that is connected to the high power supply node ($N_{ps20}$) and a low supply terminal ($V_{LOW}$) that is connected to the low power supply node ($N_{ps21}$).

In operation, shunt regulator circuit 200 receives an unregulated voltage (not shown) and provides a regulated voltage ($V_{ps20}$) at the high power supply node ($N_{ps20}$). The error amplifier circuit (210) compares the regulated voltage ($V_{ps20}$) with a reference voltage ($V_{Ref}$) that is provided by the reference voltage circuit (220) at node $N_{ps20}$. The error amplifier circuit (210) produces a control signal (e.g., $V_{Ctl}$) at node $N_{ps21}$ in response to the comparison. The shunt circuit with ESD protection (230) is controlled by the control signal. If the regulated line ($V_{ps20}$) falls out of regulation, the shunt regulator circuit (200) will activate the shunt circuit with ESD protection (230) to reduce the regulated voltage ($V_{ps20}$) at the high power supply node ($N_{ps20}$). If the result of the comparison indicates that the voltage level is correct, then the control signal will deactivate the shunt circuit with ESD protection (230).

A large amount of voltage appears at the high power supply node ($N_{ps20}$) in a relatively short period of time during an ESD event. The error amplifier circuit (210) may be unable to activate a standard shunt device (one without benefit of the present invention) to remove excess voltage before either the ESD master/slave protection device (240) or another element of the system becomes damaged. Additionally, although an ESD master/slave protection circuit (240) may be present in the system, the ESD master/slave protection circuit (240) may also be damaged by the intensity of the ESD event. Therefore, the present invention provides for a shunt circuit with enhanced ESD protection (230) to remove the excess voltage from the system in situations when a fast transient ESD event has occurred.

Figure 3:
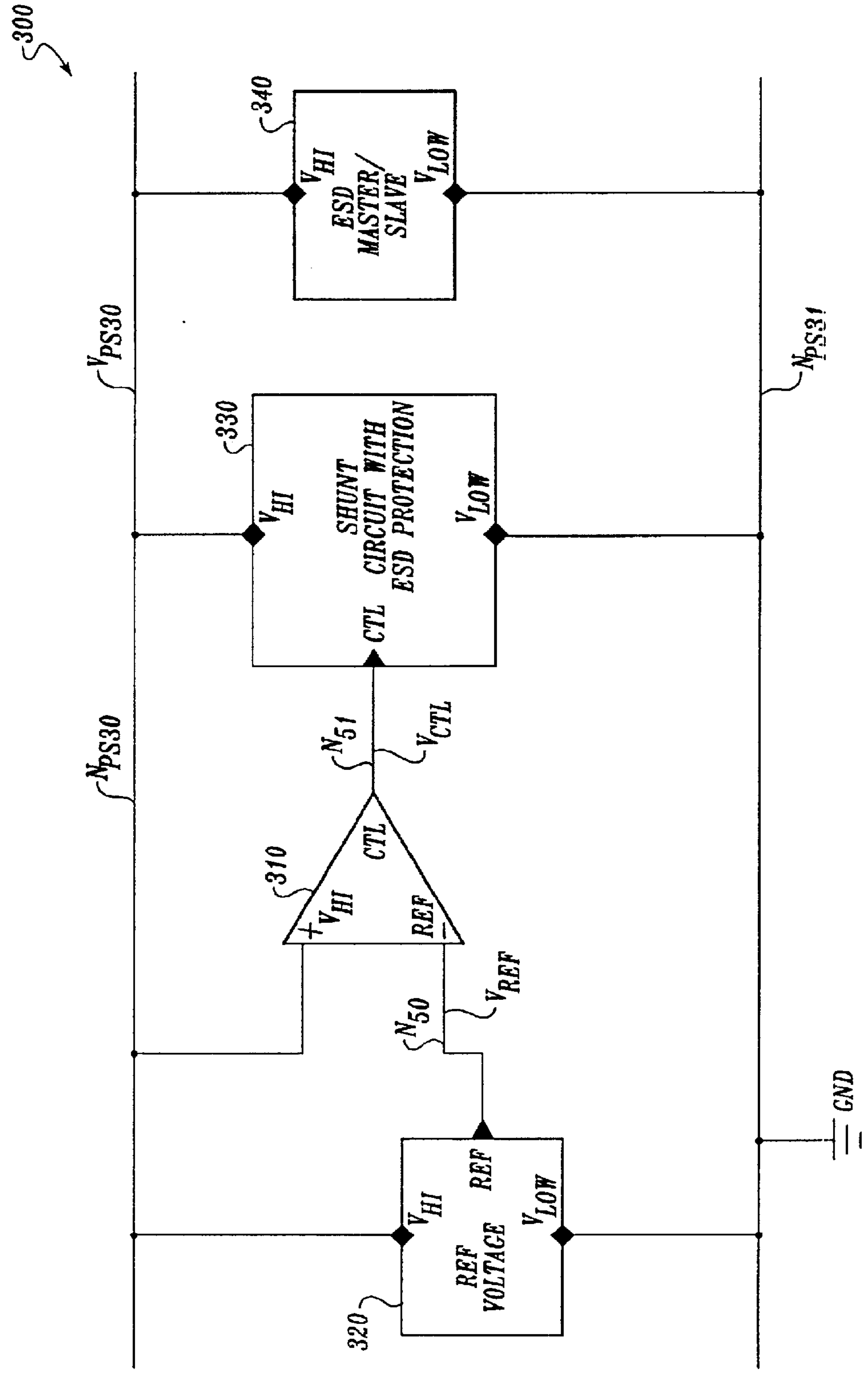
FIG. 3 is a schematic diagram illustrating an improved shunt regulator circuit that includes enhanced ESD protection in accordance with another embodiment of the present invention.

FIG. 3 is a schematic diagram illustrating an example of a shunt regulator circuit (300) with ESD protection that is in accordance with the present invention. In FIG. 3, the shunt regulator circuit (300) includes an error amplifier circuit (310), a reference voltage circuit (320), a shunt circuit with ESD protection (330), and an ESD master/slave protection circuit (340).

The error amplifier circuit (310) includes a non-inverting input (+) that is coupled to a regulated power supply node ($N_{ps30}$), an inverting input (−) that is coupled to a node ($N_{30}$), and an output terminal that is connected to a control node ($N_{31}$). The reference voltage circuit (320) includes a high supply terminal ($V_{HI}$) that is connected to the regulated power supply node ($N_{ps30}$), a low supply terminal ($V_{LOW}$) that is connected to a low power supply node ($N_{ps31}$), and an output voltage reference terminal (REF) that is connected to node $N_{30}$. The shunt circuit with ESD protection (330) (see e.g., FIG. 5) includes a high supply terminal ($V_{HI}$) that is connected to the regulated power supply node ($N_{ps30}$), a low supply terminal ($V_{LOW}$) that is connected to the low power supply node ($N_{ps31}$), and an input terminal (CTL) that is connected to the control node ($N_{31}$). The master/slave protection circuit (340) is an optional circuit (see e.g., FIG. 6) that includes a high supply terminal ($V_{HI}$) that is connected to a regulated power supply node ($N_{ps30}$), and a low supply terminal ($V_{LOW}$) that is connected to the low power supply node ($N_{ps31}$). A circuit ground potential (GND) is connected to the low power supply node ($N_{ps31}$).

The components of FIG. 3 function similarly to like named components in FIG. 2. In operation, shunt regulator circuit 300 produces a regulated voltage ($V_{ps30}$) at node $N_{ps30}$. The error amplifier circuit (310) compares the regulated voltage ($V_{ps30}$) to a reference voltage ($V_{Ref}$) that is provided by the reference voltage circuit (320) at $N_{30}$. The error amplifier circuit (310) produces a control signal (e.g., $V_{Ctl}$) at the control node ($N_{31}$) as a result of the comparison. If the result of the comparison requires the removal of excess voltage from the system, the control signal will activate the shunt circuit with ESD protection (330) to remove the excess voltage from the system. If the result of the comparison indicates that the voltage level is correct then the control signal will deactivate the shunt circuit with ESD protection (330).

Error amplifier circuit 310 is illustrated as an active circuit in FIG. 3 that is a typically an operational amplifier circuit. Error amplifier circuit 310 may be constructed of any combination of active and passive circuits to achieve the necessary results. For example, NPN transistors, PMOS transistors, NMOS transistors, GaAs FETs, JFETs, Darlington pairs, bipolar junction transistors, as well as others may be used to construct the error amplifier circuit (310).

Active circuits by their very nature require a minimum amount of time to become active or “turn on”. Unfortunately, ESD events may occur over shorter time frames than the response time of the active circuits. For example, error amplifier circuit 310 has a finite response time and slew rate that limits the error amplifier's ability to activate the shunt circuit with ESD protection (330) during a fast transient ESD event. This results in permanent damage to the shunt circuit (i.e., the voltage exceeds the breakdown voltage of one or more shunt transistors) before the amplifier can activate the shunt circuit with ESD protection (330) to prevent damage in the system. ESD events occur with such ferocity that even the slightest delay may result in catastrophic failures. Therefore, as described above, the addition of known ESD protection technology is ineffective at preventing fast transient ESD damage. The present invention provides a solution to fast ESD events by utilizing passive elements, placed at strategic locations, to enhance ESD protection.

Figure 4:
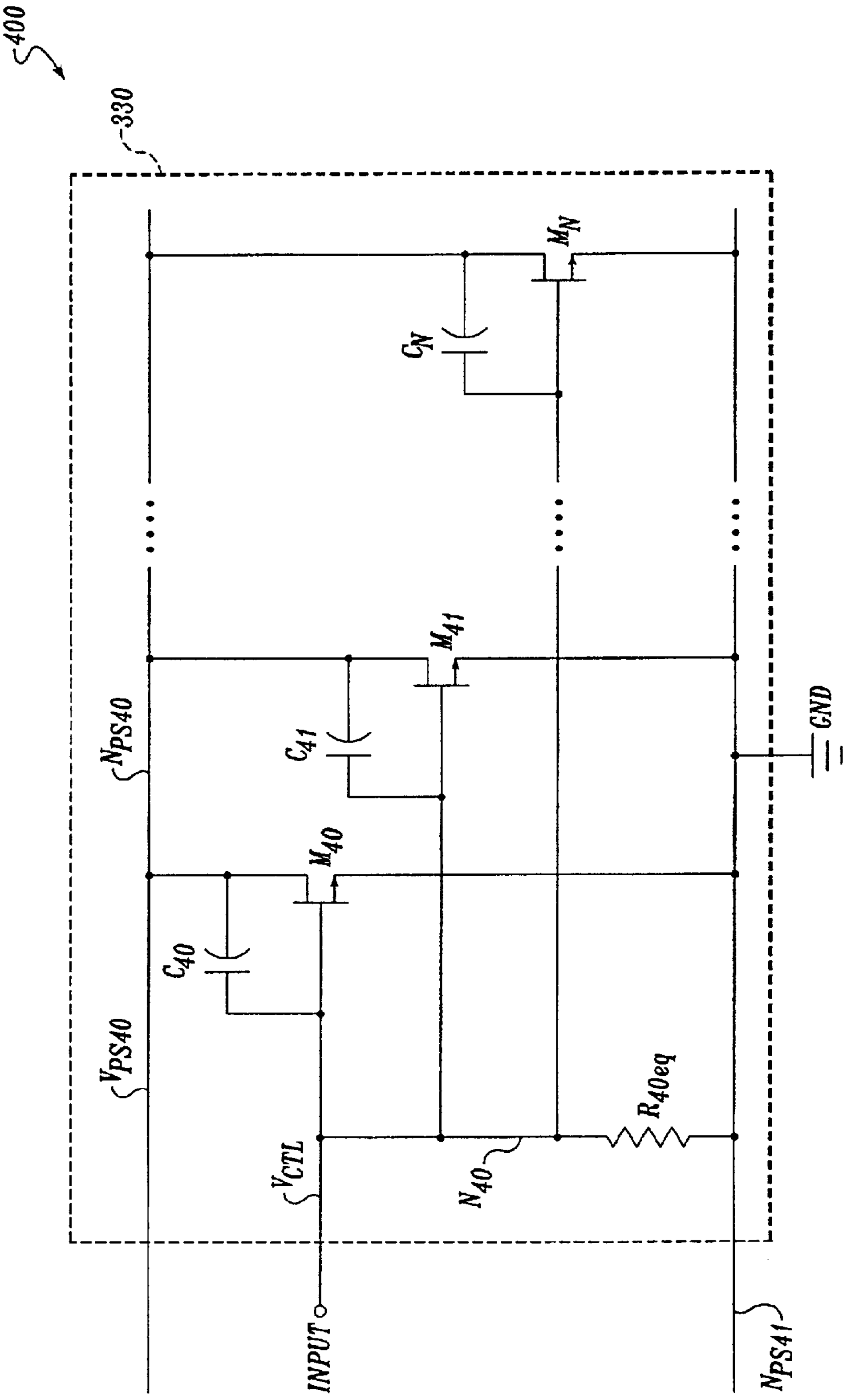
FIG. 4 is a schematic diagram illustrating an improved shunt circuit that includes enhanced ESD protection in accordance with yet another embodiment of the present invention.

FIG. 4 is a schematic illustrating an example of a shunt circuit with ESD protection (330) that is in accordance with the present invention. In FIG. 4, the shunt circuit with ESD protection (330) includes transistors ($M_{40}$, $M_{41}$, . . . , $M_{4N}$), capacitors ($C_{40}$, $C_{41}$, . . . , $C_{4N}$), and a gate load equivalent resistance ($R_{40eq}$). The transistors ($M_{40}$–$M_{4N}$) are shown as MOSFETs in this example.

Transistor $M_{40}$ is includes a drain that is connected to a regulated power supply node ($N_{ps40}$), a source that is connected to a low power supply node ($N_{ps41}$), and a gate that is connected to a control node ($N_{40}$). Capacitor $C_{40}$ is connected between the regulated power supply node ($N_{ps40}$) and control node $N_{40}$ (across the gate and drain of transistor $M_{40}$). The transistors ($M_{41}$ . . . $M_{4N}$) are arranged similarly to transistor $M_{40}$, with common drain connections to the regulated power supply node ($N_{ps40}$), common gate connections to the control node $N_{40}$, and common source connections to the low power supply node ($N_{ps41}$) Similarly, the capacitors ($C_{41}$ . . . $C_{4N}$) are connected to the numerically corresponding transistor in the same configuration that is used for capacitor $C_{40}$ and transistor $M_{40}$. Gate load equivalent resistor $R_{40eq}$ is connected between control node $N_{40}$ and the low power supply node ($N_{ps41}$). An input terminal (Input) is connected to the control node ($N_{40}$) and a circuit ground potential (GND) is connected to the low power supply node ($N_{ps21}$).

During standard operation, the shunt circuit with ESD protection (330) receives a control signal (e.g., $V_{Ctl}$) from the input terminal (Input) that activates and deactivates the transistors ($M_{40}$, $M_{41}$, . . . , $M_{4N}$) depending on the condition of the regulated power supply node ($N_{ps40}$) Activation is accomplished by supplying a sufficient amount of voltage on the gates of the transistors ($M_{40}$, $M_{41}$, . . . , $M_{4N}$) SO as to generate a field across the gate and source of the devices. Activation of the transistors ($M_{40}$, $M_{41}$, . . . , $M_{4N}$) allows for the removal of excess undesirable voltage from the regulated power supply node ($N_{ps40}$).

Active circuits, such as transistor $M_{40}$, require a minimum amount of time to become active or "turn on," as detailed above. Unfortunately, fast transient ESD events occur over shorter periods of time than the minimum time necessary to activate the devices (e.g., $M_{40}$, $M_{41}$, . . . , $M_{4N}$) Therefore, the existing components of the shunt regulator system cannot counteract the massive influx of voltage to the system caused by the ESD event. Additionally, as described above, even the addition of known ESD protection technology is ineffective at solving this problem. The present invention provides protection from fast-transient ESD events by utilizing passive elements, such as capacitors, placed at strategic locations in the shunt regulator.

The introduction of a capacitor ($C_{40}$) between the gate and drain of transistor ($M_{40}$) creates a path to the control node ($N_{40}$) for the leading edge of the initial spike in voltage emanating from the ESD event. The capacitor will conduct current until a steady-state condition is achieved (i=C dv/dt). It should be noted that the transistor ($M_{40}$) has inherent capacitance between the gate and drain, but the value of this capacitance is significantly less than the value required to practice the present invention. Also, the inherent gate-drain capacitance ($C_{GD}$) is ineffective at coupling large fast-transient signals.

During an ESD event transient current couples through the capacitor ($C_{40}$) and produces a voltage across the gate load equivalent resistance ($R_{40eq}$). The voltage across the gate load equivalent resistance ($R_{40eq}$) is provided to the gate of transistor $M_{40}$, which will "turn on" and begin the voltage discharge process from the regulated power supply node ($N_{ps40}$) to the circuit ground potential (GND). Additional transistors ($M_{41}$ . . . $M_{4N}$) and capacitors ($C_{41}$ . . . $C_{4N}$) are connected in parallel, with their numerical counterpart, to the previously described transistor/capacitor pair. The gates of the transistors ($M_{40}$ . . . $M_{4N}$) are connected to control node $N_{40}$. The control signal (e.g., $V_{Ctl}$) received from the input terminal (Input) and produced by the gate load resistor ($R_{40eq}$) are connected to the gate of transistors ($M_{40}$ . . . $M_{4N}$). The gate load equivalent resistance ($R_{40eq}$) represents the equivalent resistance of individual gate load resistors that are coupled together in parallel. Each individual gate load equivalent resistor has a value that is equal to N times the resistance value of $R_{40eq}$.

The time required to "turn on" a transistor (e.g., $M_{40}$) is dependant on the size of the transistor (e.g., $M_{40}$), the capacitor (e.g., $C_{40}$), and the gate load equivalent resistor (e.g., $R_{40eq}$). In one embodiment, the capacitor ($C_{40}$) is a 10 pF capacitor and the gate load equivalent resistance ($R_{40eq}$) has a value 1.8. kΩ. The choice of capacitance and resistance values is determined by having an equivalent capacitance and equivalent resistance contribute to an RC time constant. In one example, the RC time constant corresponds to 1 MHz.

Figure 6:
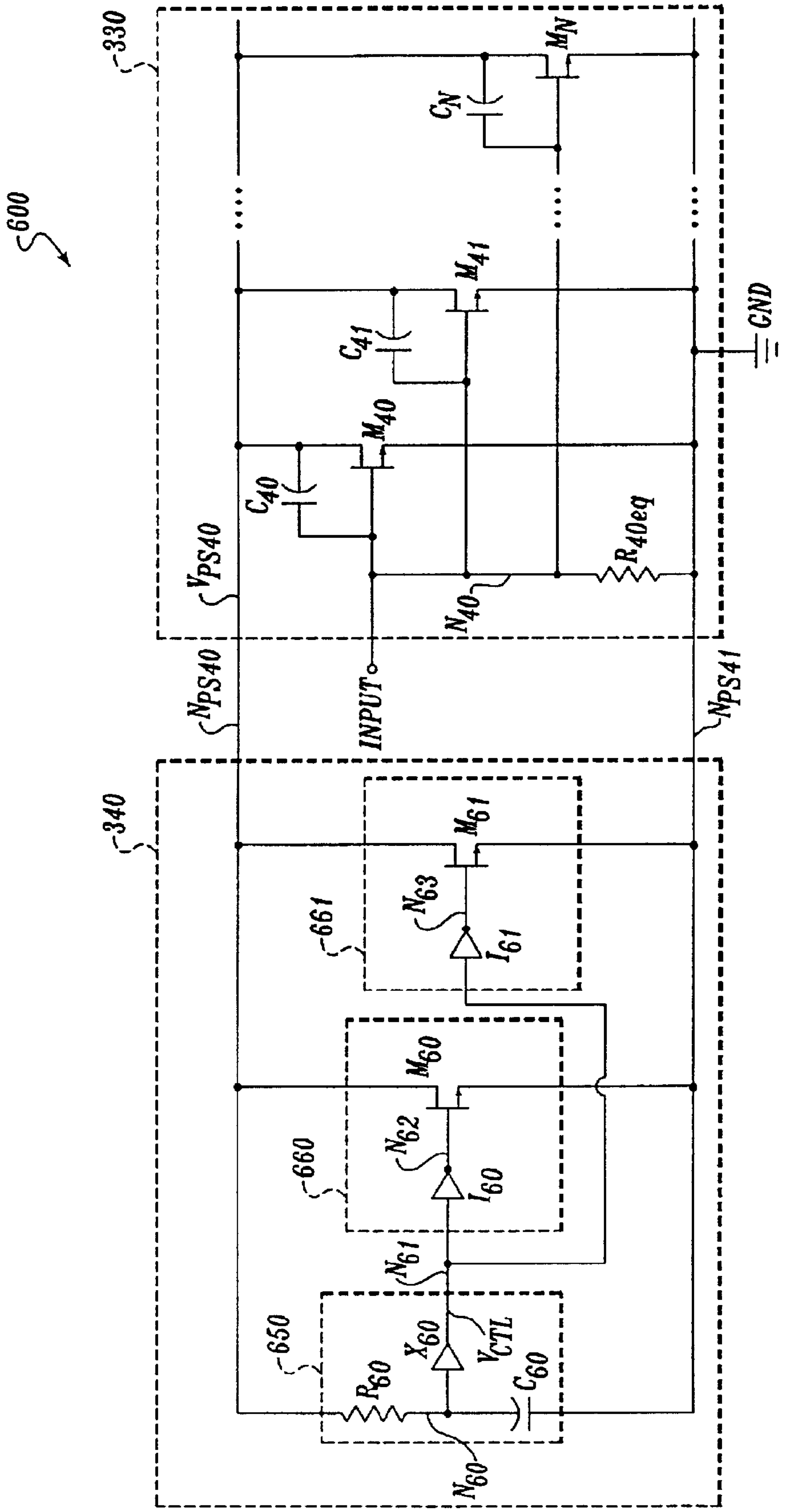
FIG. 6 is a schematic diagram illustrating an improved shunt circuit that includes enhanced ESD protection and an ESD master/slave protection circuit in accordance with still a further embodiment of the present invention.

Another embodiment is presented in FIG. 6 utilizing six transistors and six capacitors (N=6) that are arranged to provide redundancy. That is, while the shunt circuit with ESD protection (330) can operate with any number of units (each unit including a MOSFET, a gate-drain capacitor, and a gate resistor), any number more than one (N>1) will produce a circuit that will continue to function until all of the units are inoperable (i.e., in the event one device is destroyed, other devices remain operational).

Although FIG. 4 includes a MOSFET as a shunt regulation device, it is understood and appreciated that other shunt regulation devices could be used as well. For example, an NPN transistor, a PMOS transistor, an NMOS transistor, a GaAs FET, to JFET, Darlington pair, a bipolar junction transistor, as well as others may be used in the shunt regulation circuit. The gate load equivalent resistor ($R_{40eq}$) may also be replaced by any other equivalent network that would provide equivalent resistance to the gate of the transistor. For example, one or more diodes that are connected in series, transistor circuits configured as resistors, etc., may be used as a series resistance network Capacitors used in the present invention may include different types of capacitors (i.e., electrolytic, polystyrene, ceramic, etc.) so long as the material type used provides stable operation of the regulator. In integrated circuit implementations, the capacitors may be metal plate capacitors, polysilicon plate capacitors, accumulation capacitors, as well as others. Each type of capacitor has various performance criteria such as, for example, leakage characteristics, equivalent series resistance, effective impedance, voltage rating, and operating temperature variations, which may impact the present invention's performance.

Figure 5:
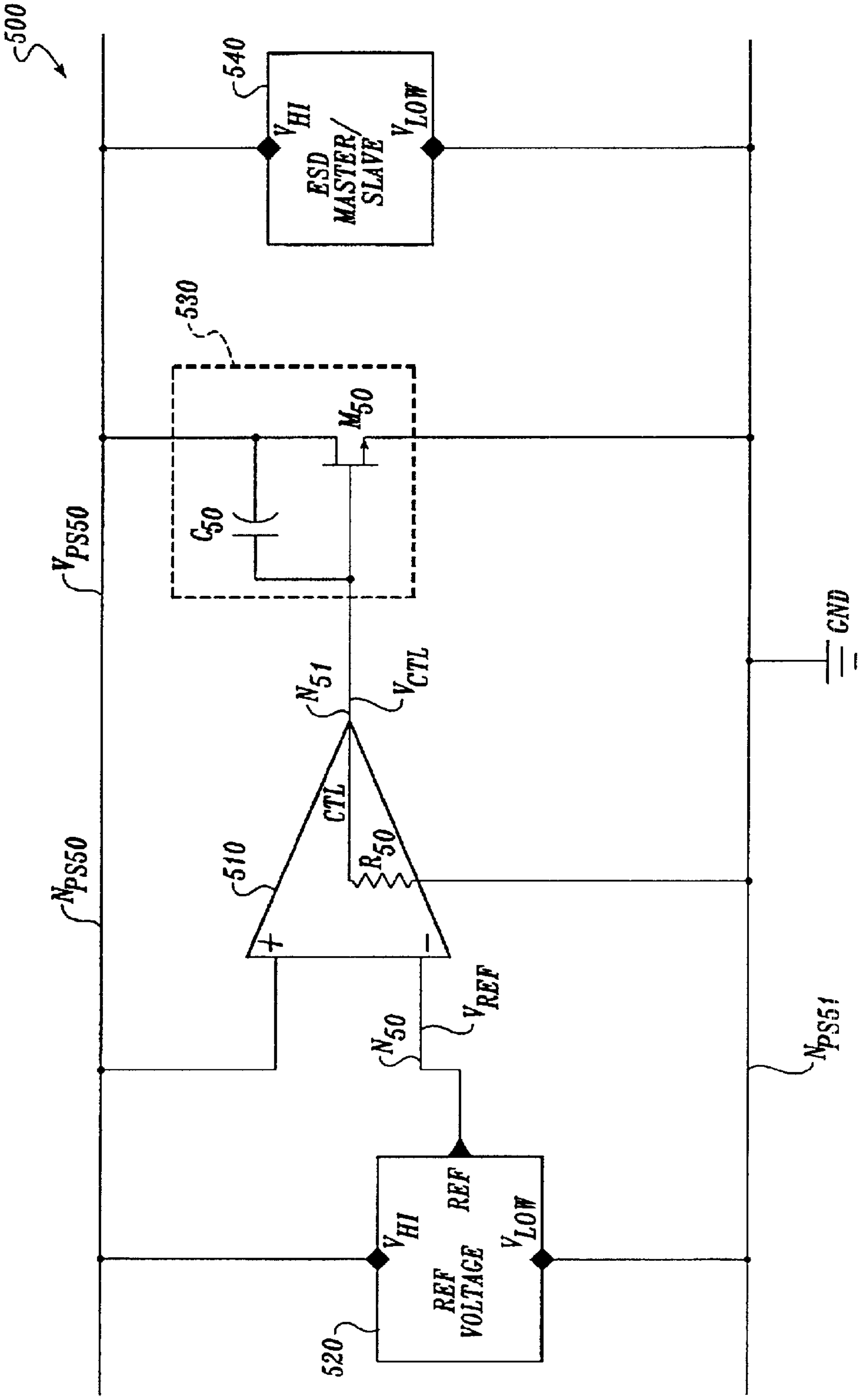
FIG. 5 is a schematic diagram illustrating an improved shunt regulator circuit that includes enhanced ESD protection in accordance with a further embodiment of the present invention.

FIG. 5 is a schematic illustrating an example of a shunt regulator circuit (500) with ESD protection that is in accordance with the present invention. In FIG. 5, the shunt regulator circuit (500) includes an operational amplifier circuit (510) that is configured as an error amplifier circuit, a reference voltage circuit (520), a shunt circuit with ESD protection (530), and an ESD master/slave protection circuit (540). The shunt circuit with ESD protection (530) includes an FET ($M_{50}$) and a capacitor ($C_{50}$).

The error amplifier circuit (510) includes a non-inverting input (+) coupled to a regulated power supply node ($N_{ps50}$), an inverting input (−) coupled to a reference node ($N_{50}$), and an output terminal (CTL) that is connected to a control node ($N_{51}$). The error amplifier circuit (510) further includes a resistor ($R_{50}$) that is internally arranged as part of the error amplifier circuit's output stage. The resistor ($R_{50}$) is connected between the error amplifier circuit output and a low power supply node ($N_{ps51}$). The reference voltage circuit (520) includes a high supply terminal ($V_{HI}$) that is connected to the regulated power supply node ($N_{ps50}$), a low supply terminal ($V_{LOW}$) that is connected to the low power supply node ($N_{ps51}$), and an output voltage reference terminal (REF) that is connected to reference node $N_{50}$. FET $M_{50}$ has a drain that is connected to the regulated power supply node ($N_{ps50}$), a source that is connected to the low power supply node ($N_{ps51}$), and a gate that is connected to the control node ($N_{51}$). Capacitor $C_{50}$ is connected between regulated power supply node $N_{ps50}$ and control node $N_{51}$, across the gate and drain of transistor $M_{50}$. The master/slave protection circuit (540) is an optional circuit that includes a high supply terminal ($V_{HI}$) that is connected to the regulated high power supply node ($N_{ps50}$) and a low supply terminal ($V_{LOW}$) that is connected to the low power supply node ($N_{ps51}$). A circuit ground potential (GND) is connected to the low power supply node ($N_{ps51}$).

In one embodiment, resistor ($R_{50}$) represents the output impedance inherent in error amplifier circuit 510 that performs the function of gate load equivalent resistor $R_{40eq}$ (see FIG. 4 and discussion), thereby replacing the gate load equivalent resistor ($R_{40eq}$). This embodiment allows designers to match the gate load equivalent resistor ($R^{40}$eq) required for the shunt circuit with ESD protection (330) (see FIGS. 3 and 4 and discussion) with a range of operational amplifier circuits that are available to function as an error amplifier. The resultant embodiment allows the use of the shunt circuit with ESD protection (530) in conjunction with the error amplifier circuit (510) chosen from the above-described criteria. The resistor ($R_{50}$) may be an actual resistor, a MOSFET resistance, or some other arrangement of components that may be represented as an effective impedance. For example, one or more diodes that are connected in series, transistor circuits configured as resistors, etc., may be used as the equivalent series resistance network.

FIG. 6 is a schematic diagram illustrating a shunt circuit with ESD protection (600) that is in accordance with the present invention. The shunt circuit with ESD protection (600) includes a shunt circuit (330), and an exemplary ESD master/slave protection circuit (340). Like components from FIGS. 4 and 6 are labeled identically. ESD master/slave protection circuit 340 includes a master circuit (650) and accompanying slave circuits (660 and 661). The master circuit (650) includes a buffer ($X_{60}$), a resistor ($R_{60}$), and a capacitor ($C_{60}$). The two slave circuits (660 and 661) each include an inverter ($I_{60}$ and $I_{61}$) and a FET ($M_{60}$ and $M_{61}$), the components include numerically corresponding labels.

The buffer ($X_{60}$) includes an input that is connected to node $N_{60}$, and an output that is connected to node $N_{61}$. Resistor $R_{60}$ is connected between node $N_{60}$ and a regulated power supply node ($N_{ps40}$). Capacitor $C_{60}$ is connected between node $N_{60}$ and a low power supply node ($N_{ps41}$). Inverter $I_{60}$ is connected between node $N_{61}$ and node $N_{62}$. FET $M_{60}$ has a gate that is connected to node $N_{62}$, a drain that is connected to the regulated power supply node ($N_{ps40}$), and a source that is connected to the low power supply node ($N_{ps41}$). Inverter $I_{61}$ is connected between node $N_{61}$ and node $N_{63}$. FET $M_{61}$ has a gate that is connected to node $N_{63}$, a drain that is connected to the regulated power supply node ($N_{ps40}$), and a source that is connected to the low power supply node ($N_{ps41}$). A circuit ground potential (GND) is connected to the low power supply node ($N_{ps41}$)

ESD master/slave protection circuit 340 is an optional circuit that provides enhanced ESD protection in conjunction with the present invention (shunt circuit with ESD protection 330). Shunt circuit with ESD protection 330 functions as previously described with respect to FIGS. 4 and 5. In one embodiment, ESD master/slave protection circuit 340 remains in an "off" state until an ESD event occurs. When an ESD event occurs, a voltage drop develops across resistor ($R_{60}$) that is sufficient to activate buffer ($X_{60}$), which transmits a control signal (e.g., $V_{Ctl}$) to inverters ($I_{60}$ and $I_{61}$). Inverters ($I_{60}$ and $I_{61}$) provide an output voltage that corresponds to an inverse logic signal of the control signal. The inverse control signal is provided to the gate of each transistor ($M_{60}$ and $M_{61}$). The voltage applied to the gate of each transistor biases the gate of each corresponding transistor ($M_{60}$ and $M_{61}$) and "turns-on" each transistor ($M_{60}$ and $M_{61}$). Once the transistors "turn-on," the excess voltage from the ESD event is shunted to the circuit ground potential (GND). Because the ESD master/slave protection circuit (340) utilizes active elements to control the process of removing excess voltage from the ESD event from the system, active elements of ESD master/slave protection circuit 340 will not react to fast-transient ESD events as previously described. However, the ESD master/slave protection circuit (340) will react to slower ESD events and provides complementary ESD protection to the present invention.

Figure 7:
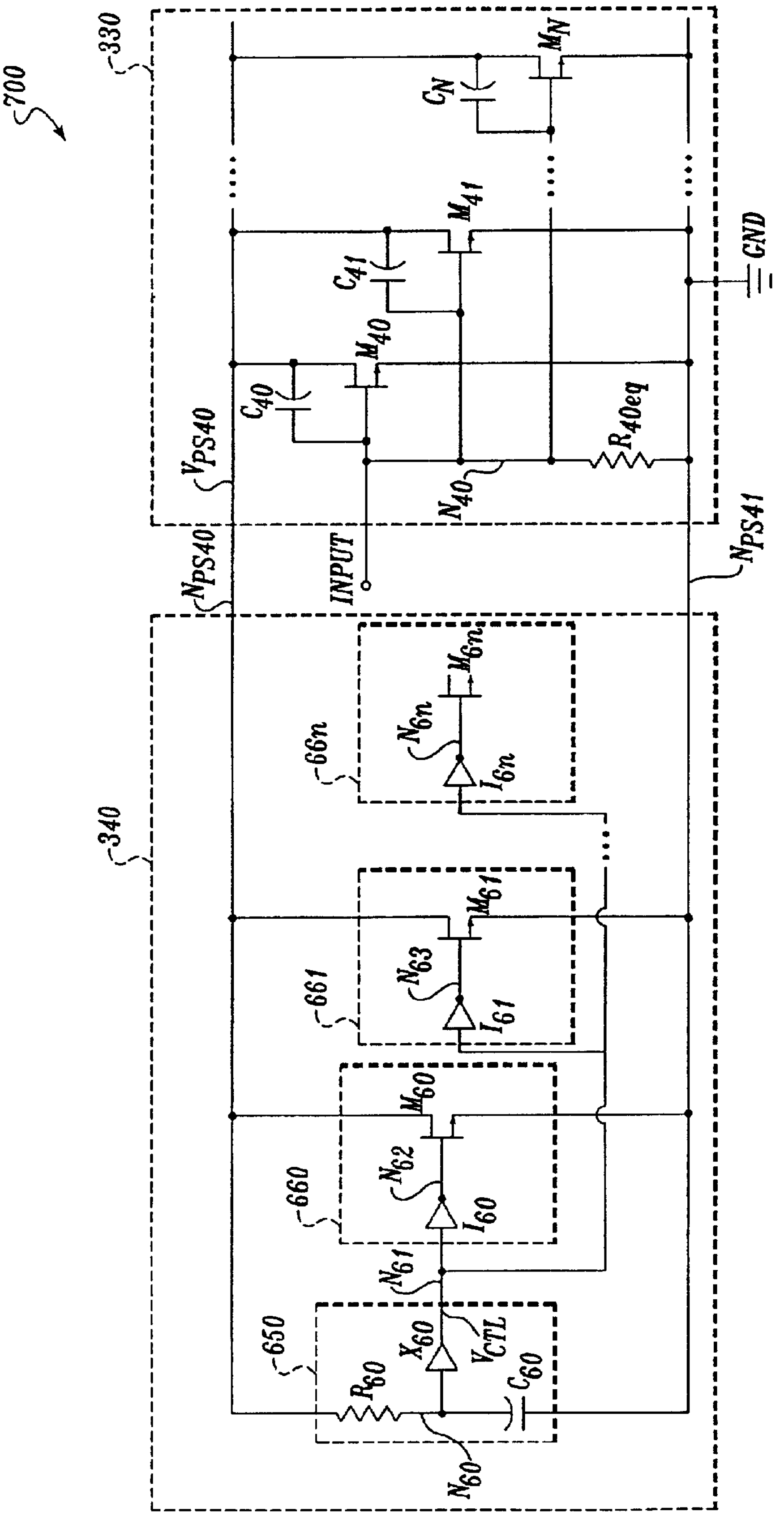
FIG. 7 is a schematic diagram illustrating an improved shunt circuit that includes enhanced ESD protection and an ESD master/slave protection circuit in accordance with yet a further embodiment of the present invention.

FIG. 7 is a schematic diagram illustrating a shunt circuit with ESD protection (700) in accordance with the present invention. The shunt circuit with ESD protection (700) includes a shunt circuit (330), and another embodiment of the ESD master/slave protection circuit (340). Like components from FIGS. 4, 6, and 7 are labeled identically. ESD master/slave protection circuit 340 includes a single master circuit (650), that includes buffer $X_{60}$, resistor $R_{60}$, and capacitor $C_{60}$ and multiple slave circuits (660 and 661) as previously described with reference to FIG. 6.

ESD master/slave circuit 340 further includes multiple slaves 66n, representing any number of additional slaves that may be included in the ESD master/slave protection circuit (340). Each slave includes an inverter ($I_{61} \ldots I_{6n}$) similar to inverter 160, and a transistor ($M_{61} \ldots M_{6n}$), which is similar to transistor $M_{60}$. The inverters ($I_{61} \ldots I_{6n}$) are connected in parallel to node $N_{61}$. Similarly, each transistor's ($M_{61} \ldots M_{6n}$) gate is connected to the numerically corresponding inverter ($I_{61} \ldots I_{6n}$) at the numerically corresponding node $N_{6n}$, the numerically corresponding inverter is connected in the same configuration as inverter $I_{60}$ at node $N_6$. Similarly, each transistor's ($M_{61} \ldots M_{6n}$) drain is connected to the regulated power supply node ($N_{ps40}$) and each transistor's ($M_{61} \ldots M_{6n}$) source is connected to a low power supply node ($N_{ps41}$). A circuit ground potential (GND) is connected to the low power supply node ($N_{ps21}$).

In one embodiment, ESD master/slave circuit 340 includes one master component and a number of slave components equal to the pin count with each slave that is connected to and protecting a different pin. Again, the luxury of this redundancy of protection comes at the expense of the loss of fabrication area availability.

Although the above description of FIGS. 4–7 illustrate a single resistive component ($R_{40eq}$ or $R_{50}$) arranged to operate as a gate resistor, it is understood and appreciated that other arrangements are within the scope of the present invention. For example, the single series resistor may be represented as two or more resistors in series and/or parallel combination with one another. Additionally, two or more resistors may be arranged in series with the gate-drain capacitor.

In another embodiment, each shunt device (e.g., $M_{40}$) in the shunt device with ESD protection (330) has a single resistor (e.g., $R_{eq40}$) and capacitor (e.g., $C_{40}$) associated therewith. The single resistor, capacitor, and shunt device may be arranged in an optimal physical layout such as a standard cell.

Although circuits described herein are described within the context of an ESD protection circuit, the methods and apparatus described herein are equally applicable to other events that are not due to electrostatic discharge. For example, a fast glitch of one or more power supply lines that occurs upon activation of one or more power sources, electromagnetic interference (EMI), connection of an illegal charger to the shunt regulator, the illegal charger containing a charge beyond the rating of the protection circuit, or where the shunt regulator circuit is activated by a hot supply, where the hot supply has an output filter capacitor that may have a open circuit voltage which exceeds the normal operating voltage of the shunt regulator. The shunt regulator must be protected from these types of events in addition to the fast transient ESD events described above. The methods and apparatus described herein can be applied to other transient events in addition to those listed above.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for improving immunity from transient events in a shunt circuit that includes a control terminal, the apparatus comprising:

a protection circuit that is arranged to couple a fast transient signal to the control terminal in response to a fast transient event such that the shunt circuit is activated in response to the fast transient signal and the shunt circuit is protected from the fast transient event; and a plurality of field effect transistors that are arranged to couple power from a power supply terminal to a circuit ground terminal in response to a control voltage that is associated with the control terminal, wherein the protection circuit is arranged to couple the fast transient signal to each gate of each of the plurality of field effect transistors in response to the fast transient event such that each of the plurality of field effect transistors is activated and a fast transient voltage associated with the power supply terminal is discharged to the circuit ground terminal.

2. An apparatus as in claim 1, the protection circuit further comprising a capacitance circuit that is arranged to couple the fast transient signal from a regulated power supply terminal to the control terminal in response to the fast transient event, wherein the fast transient event causes a fast transient voltage to occur at the regulated power supply terminal.

3. An apparatus as in claim 1, the protection circuit further comprising a resistance circuit that is arranged between the control terminal and a circuit ground terminal such that a potential drop develops across the resistance circuit in response to the fast transient signal, and the potential drop activates the shunt circuit such that the shunt circuit is protected from the fast transient event.

4. An apparatus as in claim 1, the shunt circuit further comprising a field effect transistor that is arranged to couple power from a power supply terminal to a circuit ground terminal response to a control voltage that is associated with the control terminal, wherein the protection circuit is arranged to couple the fast transient signal to the gate of the field effect transistor in response to the fast transient event such that the field effect transistor is activated and a fast transient voltage associated with the power supply terminal is discharged to the circuit ground terminal.

5. An apparatus as in claim 4, the protection circuit fry comprising:

a capacitance circuit that is arranged to coupled the fast transient signal firm the power supply terminal to the control terminal; and a resistance circuit that is arranged to produce the control voltage in response to the fast transient signal.

6. An apparatus as in claim 5, wherein an effective resistance of the resistance circuit and an effective capacitance of the capacitance circuit determine a signal level and an associated fast transient response time of the fast transient signal.

7. An apparatus as in claim 6, wherein the resistance circuit is included in an error amplifier circuit that is arranged to provide the control signal to the control terminal, wherein the error amplifier circuit has an associated amplifier transient response time that is slower than the fist transient response time such that the capacitance circuit provides a signal path to the control terminal that responds to the fast transient event before the error amplifier circuit can react.

8. An apparatus as in claim 1, the protection circuit further comprising a plurality of capacitance circuits, wherein each of the plurality of capacitance circuits is arranged to cooperate with a corresponding one of the plurality of field effect transistors such that each corresponding one of the plurality of capacitance circuits couples the fast transient signal to the gate of the corresponding one of the plurality of field effect transistors.

9. An apparatus as in claim 8, further comprising a resistance circuit that is arranged to produce a control voltage at the control terminal in response to the fast transient signal.

10. An apparatus as in claim 8, further comprising a plurality of resistance circuits, each of the plurality of resistance circuits is arranged to cooperate with a corresponding one of the plurality of field effect transistors, wherein an effective total resistance of the plurality of resistance circuits is arranged to produce a control voltage at the control terminal in response to the fast transient signal.

11. An apparatus for improving electrostatic discharge protection in a shunt regulator comprising:

an error amplifier circuit that is arranged to produce a control signal at a control terminal in response to a reference potential and a potential at a power supply terminal, the error amplifier having an amplifier response time;

a capacitance circuit that is arranged to couple a fast transient signal to the control terminal in response to a fast transient ESD event that occurs at the power supply terminal;

a resistance circuit that is arranged to produce another control signal at the control terminal in response to the fast transient signal;

a shunt circuit that is arranged to selectively couple power from the power supply terminal to a circuit ground terminal when activated, wherein the shunt circuit is activated and deactivated by the control signal during normal operation and the shunt circuit is activated by the another control signal during the fast transient ESD event such that excess energy from the fast transient ESD event is shunted from the power supply terminal to the circuit ground terminal by providing the another control signal to the control terminal in a time interval that is shorter than the amplifier response time; and a master ESD protection circuit that is arranged to produce an ESD detection signal, and at least one slave ESD protection circuit that is arranged to provide another discharge path from the power supply terminal to the circuit ground terminal in response to the ESD detection signal, whereby the master ESD protection circuit and the at least one slave ESD protection circuit provides protection to the shunt circuit from slow ESD transient evens.

12. An apparatus as in claim 11, wherein the shunt circuit includes a transistor that is arranged to selectively couple power from the power supply terminal to the circuit ground potential in response to at least one of the control signal and the another control signal.

13. An apparatus as in claim 11, wherein the capacitance circuit conducts a current during the fast transient ESD event, and the resistance circuit is arranged to produce a voltage drop in response to the current such that the voltage drop corresponds to another control signal.

14. An apparatus as in claim 13, wherein the capacitance circuit and the resistance circuit are arranged to provide an RC time constant that corresponds to at least one mega-hertz in frequency.

15. A method of protecting a shunt device in a shunt circuit regulator from a fast ESD event on a power terminal, comprising:

detecting the fast ESD event with a capacitance circuit;

providing a current through the capacitance circuit in response to the fast ESD event;

producing a potential in response to the current;

coupling the potential to each gate of each of a plurality of transistors in response to the fast ESD event such that each of the plurality of transistors is activated and such that the potential activates the shunt circuit; and coupling power from the power terminal through the shunt circuit to the circuit ground potential when the shunt device is active such that the shunt device is protected from the energy produced by the fast ESD event.

16. A method as in claim 15, producing a potential further comprising coupling the current to a resistance circuit such that the current flows through the resistance circuit and produces a potential.

17. A method of protecting a shunt device in a shunt circuit regulator from a fast ESD event on a power terminal, comprising:

detecting the fast ESD event with a capacitance circuit;

providing a current through the capacitance circuit in response to the fast ESD event;

producing a potential in response to the current;

coupling the potential to a control terminal of the shunt device such that the potential activates the shunt circuit;

coupling power from the power terminal through the shunt circuit to the circuit ground potential when the shunt device is active such that the shunt device is protected from the energy produced by the fast ESD event;

detecting a slow ESD event an the power terminal with a master ESD protection circuit;

producing an ESD detection signal in response to the slow ESD event;

activating at least one slave ESD protection circuit in response to the ESD detection signal; and providing a discharge path from the power terminal to the circuit ground potential through the at least one slave ESD protection circuit such that the shunt device is protected from the energy produced by the slow ESD event.

18. An apparatus for improving immunity from transient events in a shunt circuit that includes a control terminal, the apparatus comprising:

a protection circuit that is arranged to couple a fast transient signal to the control terminal in response to a fast transient event such that the shunt circuit is activated in response to the fast transient signal and the shunt circuit is protected from the fast transient event; and a master ESD protection circuit that is arranged to produce an ESD detection signal, and at least one slave ESD protection circuit that is arranged to provide a discharge path from a power supply terminal to a circuit ground terminal in response to the ESD detection signal, whereby the master ESD protection circuit and the at least one slave ESD protection circuit provide protection to the shunt circuit from slow ESD transient events.

19. An apparatus for improving electrostatic discharge protection in a shunt regulator comprising:

an error amplifier circuit that is arranged to produce a control signal at a control terminal in response to a reference potential and a potential at a power supply terminal, the error amplifier having an amplifier response time;

a capacitance circuit that is arranged to couple a fast transient signal to the control terminal in response to a fast transient ESD event that occurs at the power supply terminal;

a resistance circuit that is arranged to produce another control signal at the control terminal in response to the fast transient signal;

a shunt circuit that is arranged to selectively couple power from the power supply terminal to a circuit ground terminal when activated, wherein the shunt circuit is activated and deactivated by the control signal during normal operation and the shunt circuit is activated by the another control signal during the fast transient ESD event such that excess energy from the fast transient ESD event is shunted from the power supply terminal to the circuit ground terminal by providing the another control signal to the control terminal in a time interval that is shorter than the amplifier response time; and a plurality of transistors that are arranged to couple power from the power supply terminal to the circuit ground terminal in response to the control signal, wherein the shunt circuit is arranged to couple a fast signal that is associated with the fast transient ESD event to each gate of each of the plurality of transistors in response to the fast transient event such that each of the plurality of transistors is activated and a fast transient voltage associated with the power supply terminal is discharged to the circuit ground terminal.

20. An apparatus as in claim 11, wherein the fast transient ESD event occurs over a time interval, the time interval is less than the amplifier response time, the capacitance circuit has an associated capacitance, and wherein the associated capacitance is sufficiently great to couple the fast transient signal to the control terminal within the time interval.

21. An apparatus for improving electrostatic discharge protection in a shunt regulator comprising:

a means for amplifying that is arranged to produce a control signal at a control terminal in response to a reference potential and a regulation potential, wherein the regulation potential is associated with a power supply terminal;

a means for coupling that is arranged to couple a fast transient signal to the control terminal in response to a fast transient ESD event that occurs at the power supply terminal;

a means for producing that is arranged to produce another control signal at the control terminal in response to the fast transient signal;

a means for shunting that is arranged to selectively couple power from the power supply terminal to a circuit ground terminal when activated, wherein the shunt circuit is activated and deactivated by the control signal during normal operation and the shunt circuit is activated by the another control signal during the fast transient ESD event such that excess energy from the fast transient ESD event is shunted from the power supply terminal to the circuit ground terminal by providing the another control signal to the control terminal in a time interval that is shorter than the amplifier response time;

a means for detecting that is configured to detect a slow ESD event on the power supply terminal with a master ESD protection circuit; and a means for providing that is configured to provide a discharge path from the power supply terminal to the circuit ground terminal through at least one slave ESD protection circuit such that the means for shunting is protected from energy produced by the slow ESD event.

22. An apparatus for improving electrostatic discharge protection in a shunt regulator comprising:

a means for amplifying that is arranged to produce a control signal at a control terminal in response to a reference potential and a regulation potential, wherein the regulation potential is associated with a power supply terminal;

a means for coupling that is arranged to couple a fast transient signal to the control terminal in response to a fast transient ESD event that occurs at the power supply terminal;

a means for producing that is arranged to produce another control signal at the control terminal in response to the fast transient signal;

a means for shunting that is arranged to selective couple power from the power supply terminal to a circuit ground terminal when activated, wherein the shunt circuit is activated and deactivated by the control signal during normal operation and the shunt circuit is activated by the another control signal during the fast transient ESD event such that excess energy from the fast transient ESD event is shunted from the power supply terminal to the circuit ground terminal by providing the another control signal to the control terminal in a time interval that is shorter than the amplifier response time, the means for shunting comprising a plurality of transistors that are arranged to couple power from the power supply terminal to the circuit ground terminal in response to the control signal, wherein the means for shunting is arranged to couple a fast transient signal that is associated with the fast transient ESD event to each gate of each of the plurality of transistors in response to the fast transient event such that each of the plurality of transistors is activated and a fast transient voltage associated with the power supply terminal is discharged to the circuit ground terminal.

* * * * *

UNITED STATES PATENT AND TRADEMARK OFFICE
CERTIFICATE OF CORRECTION

PATENT NO. : 6,775,112 B1
DATED : November 12, 2004
INVENTOR(S) : Gregory J. Smith et al.

It is certified that error appears in the above-identified patent and that said Letters Patent is hereby corrected as shown below:

Title page,
Item [57], ABSTRACT, "and cause the active device to 'turn on'" should read -- and cause the active device to "turn on." --

Column 7,
Line 20, "SO as to" should read -- so as to --

Column 8,
Line 6, "1.8. kΩ." should read -- 1.8 kΩ. --
Line 23, "a GaAs, FET to JFET" should read -- a GaAs, FET JFET --

Column 10,
Line 31, "inverter 160" should read -- inverter $I_{60}$ --
Line 38, "at node $N_6$" should read -- at node $N_{61}$ --

Column 11,
Line 59, "ground terminal response to" should read -- ground terminal in response to --
Line 66, "the protection circuit fry" should read -- the protection circuit further --

Column 12,
Line 2, "the signal firm the power" should read -- the signal from the power --
Line 15, "slower than the fist" should read -- slower than the first --

Column 13,
Line 6, "transient evens" should read -- transient events --.
Line 56, "a slow ESD event an the power" should read -- a slow ESD event on the power --

UNITED STATES PATENT AND TRADEMARK OFFICE

CERTIFICATE OF CORRECTION

PATENT NO. : 6,775,112 B1
DATED : November 12, 2004
INVENTOR(S) : Gregory J. Smith et al.

It is certified that error appears in the above-identified patent and that said Letters Patent is hereby corrected as shown below:

Column 14,
Line 48, "to couple a fast signal" should read -- to couple a fast transient signal --

Signed and Sealed this

Fifteenth Day of February, 2005

JON W. DUDAS
*Director of the United States Patent and Trademark Office*

UNITED STATES PATENT AND TRADEMARK OFFICE

CERTIFICATE OF CORRECTION

PATENT NO. : 6,775,112 B1

DATED : August 10, 2004

INVENTOR(S) : Gregory J. Smith et al.

It is certified that error appears in the above-identified patent and that said Letters Patent is hereby corrected as shown below:

Title page,
Item [57], ABSTRACT, "and cause the active device to 'turn on'" should read -- and cause the active device to "turn on." --.

Column 7,
Line 20, "SO as to" should read -- so as to --.

Column 8,
Line 6, "1.8. kΩ." should read -- 1.8 kΩ. --.
Line 23, "a GaAs, FET to JFET" should read -- a GaAs, FET JFET --.

Column 10,
Line 31, "inverter 160" should read -- inverter $I_{60}$ --.
Line 38, "at node $N_6$" should read -- at node $N_{61}$ --.

Column 11,
Line 59, "ground terminal response to" should read -- ground terminal in response to --.
Line 66, "the protection circuit fry" should read -- the protection circuit further --.

Column 12,
Line 2, "the signal firm the power" should read -- the signal from the power --.
Line 15, "slower than the fist" should read -- slower than the first --.

Column 13,
Line 6, "transient evens" should read -- transient events --.
Line 56, "a slow ESD event an the power" should read -- a slow ESD event on the power --.

UNITED STATES PATENT AND TRADEMARK OFFICE

CERTIFICATE OF CORRECTION

PATENT NO. : 6,775,112 B1

DATED : August 10, 2004

INVENTOR(S) : Gregory J. Smith et al.

It is certified that error appears in the above-identified patent and that said Letters Patent is hereby corrected as shown below:

Column 14,

Line 48, "to couple a fast signal" should read -- to couple a fast transient signal --.

This certificate supersedes Certificate of Correction issued February 15, 2005.

Signed and Sealed this

Twenty-first Day of February, 2006

JON W. DUDAS

*Director of the United States Patent and Trademark Office*